No. 679,402. Patented July 30, 1901.
J. S. SWENSON.
STUMP EXTRACTOR.
(Application filed May 13, 1901.)
(No Model.) 2 Sheets—Sheet 1.
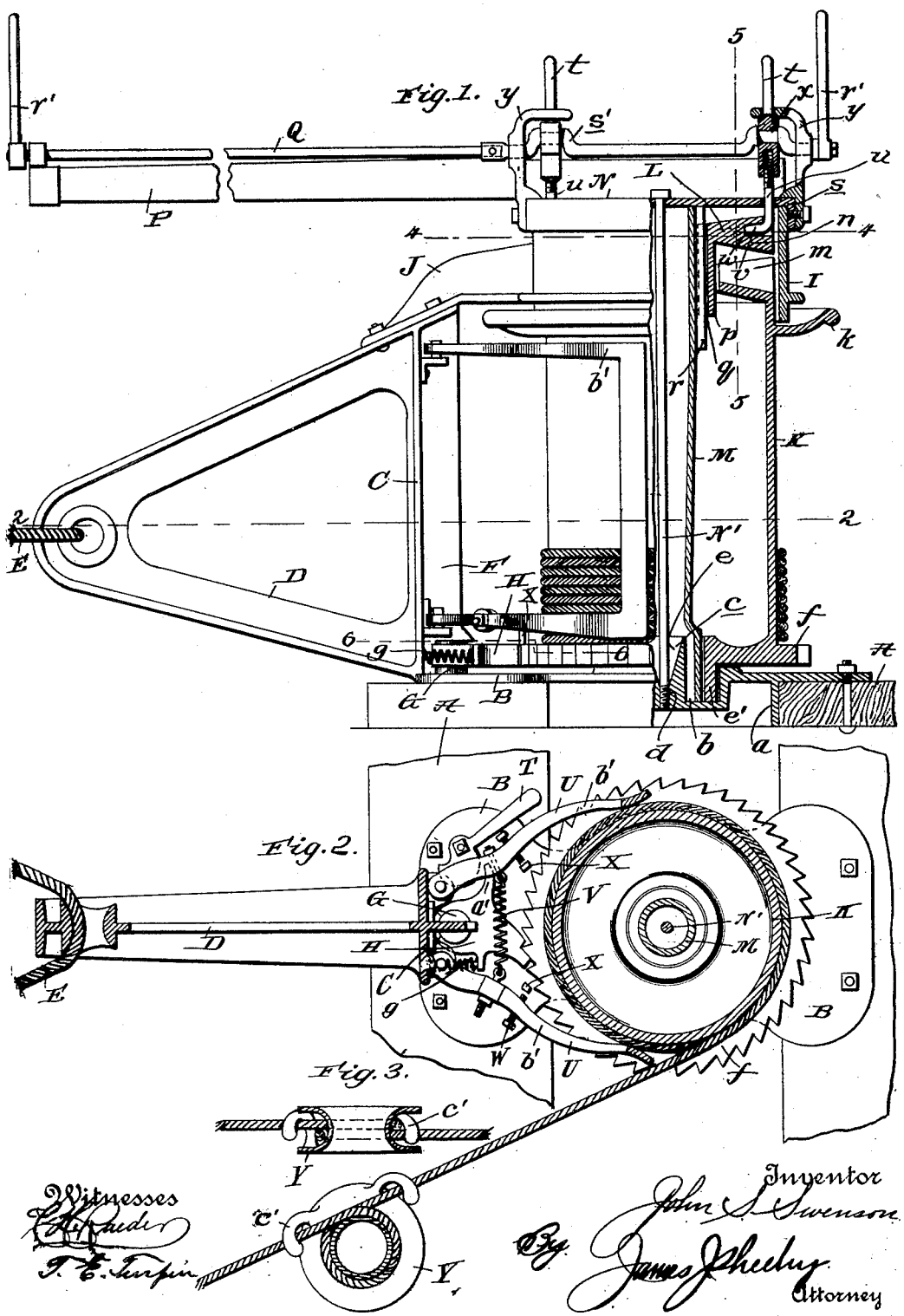

No. 679,402. Patented July 30, 1901.
J. S. SWENSON.
STUMP EXTRACTOR.
(Application filed May 13, 1901.)
(No Model.)  2 Sheets—Sheet 2.

Witnesses
Inventor
John S. Swenson
By James Sheehy
Attorney

THE NORRIS PETERS CO., PHOTO-LITHO., WASHINGTON, D. C.

UNITED STATES PATENT OFFICE.

JOHN S. SWENSON, OF CRESCO, IOWA, ASSIGNOR OF ONE-HALF TO LORENS SWENSON, OF SAME PLACE.

STUMP-EXTRACTOR.

SPECIFICATION forming part of Letters Patent No. 679,402, dated July 30, 1901.

Application filed May 13, 1901. Serial No. 60,082. (No model.)

*To all whom it may concern:*

Be it known that I, JOHN S. SWENSON, a citizen of the United States, residing at Cresco, in the county of Howard and State of Iowa, have invented new and useful Improvements in Stump-Extractors, of which the following is a specification.

My invention relates to improvements in stump-extractors, and contemplates the provision of a stump-extractor embodying simple and inexpensive means calculated to effectually prevent lapping of the cable on the drum when the latter is rotated, this in order to insure the even winding of the cable on the drum in one or a plurality of layers in such manner that each of the layers will present a smooth and even surface on which to wind a succeeding layer, if desired.

The invention also contemplates the provision of a stump-extractor in which the sweep-casting and sweep are mounted in such manner that the drum is not subjected to undue friction when out of gear.

The invention further contemplates the provision, in a stump-extracting apparatus, of a slack-rope reel for shortening the cable, so that a longer cable than can be wound on the drum may be used or so as to obviate the necessity of winding all of the cable on the drum when the stump being operated on is located close to the extractor, the said reel being simple and inexpensive and very convenient in that it may be readily attached to the cable at any point intermediate of the stump and drum and when not needed may be expeditiously removed from the cable, and this without entailing the disconnection of the cable from the drum or the stump that is being extracted.

Other advantageous features of the invention will be fully understood from the following description and claims when taken in conjunction with the accompanying drawings, in which—

Figure 4:
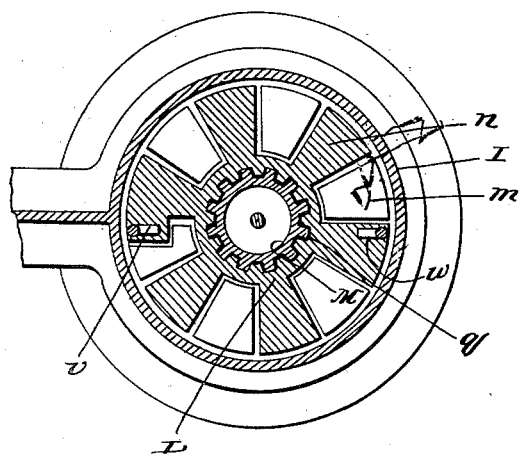
Figure 5:
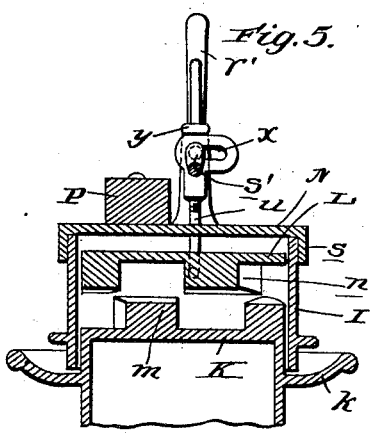
Figure 6:
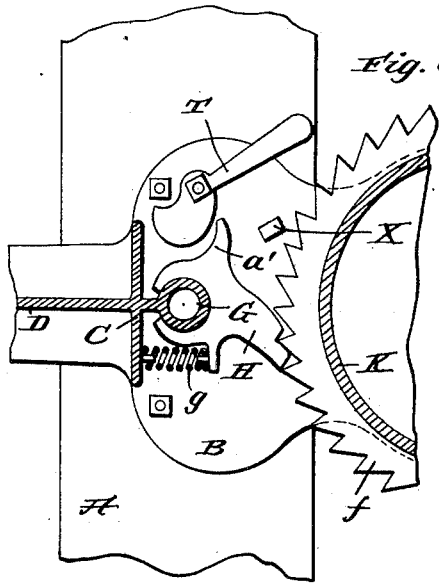

Figure 1 is a view, partly in elevation and partly in vertical section, of my improved extractor. Fig. 2 is a horizontal section taken on the line 2 2 of Fig. 1. Fig. 3 is a diametrical section of my improved slack-rope reel, the same being shown in proper position on a cable. Fig. 4 is a detail horizontal section taken in the plane indicated by the line 4 4 of Fig. 1. Fig. 5 is a detail vertical section taken in the plane indicated by the line 5 5 of Fig. 1 looking toward the right. Fig. 6 is a detail horizontal section taken on the line 6 6 of Fig. 1.

In the said drawings similar letters of reference designate corresponding parts in all of the several views, referring to which—

A A are bed-timbers on which my improved extractor is arranged so that it may be conveniently dragged from one point of operation to another, and B is the base-plate of the main frame of the extractor. This base plate is arranged upon and connected to the timbers A and is provided between the same with a depending circular flange $a$. It is also provided within the flange with a central cup or depression $b$, from the bottom of which rises a central post $c$, having interior threads $d$ and a taper bore $e$ leading thereto, as shown in Fig. 1, for a purpose presently pointed out. At one end the base-plate B is formed integral with an upright post C, which is provided at its outer side with a lateral wing D for the connection of an anchor-cable E and at its inner side with a rib F. The said rib F terminates at its lower end in a portion G of circular form in cross-section, said portion G being provided in order to permit of the pivotal connection of a pawl H, presently described, without entailing cutting away or otherwise weakening the rib F.

In addition to the base-plate B and the upright post C the main frame of the machine comprises a ring I, which has a lateral arm J, bolted or otherwise suitably connected to the upper end of the post C.

K is the cable-winding drum of the extractor. This drum is provided at its lower end with a trunnion $e'$, arranged and adapted to turn in the cup or depression $b$ of base-plate B, and it is also provided adjacent to said base-plate with a laterally-toothed flange $f$, the latter being provided for the engagement of the pawl H, which is backed by a spring $g$, and has for its purpose to hold the drum against retrograde rotary movement when a cable is being wound thereon, with a view of preventing loosening of the cable, and is also designed to prevent the sweep, presently described, from swinging around and injuring the attendant or attendants in the event of the harness of the draft-animals breaking or any other parts getting out of order. Adjacent to its upper end the drum K is provided with a lateral flange $k$, which affords a convenient handhold and is designed to enable the attendant to expeditiously rotate the drum by hand either to unwind the cable therefrom or wind the cable thereon, while at its upper end said drum has a circular series of upwardly-extending projections $m$ for a purpose presently pointed out.

The upper end of the drum K is arranged and adapted to turn within the ring I of the main frame, and above it is disposed a vertically-movable clutch L. This clutch L has depending projections $n$, designed to intermesh with the projections $m$ of the drum, and also has a central depending sleeve $p$, provided in its inner side with recesses $q$, the latter for the reception of the circular series of ribs $r$ on the sleeve M of the sweep-support. The said sleeve M is arranged at its lower end in the cup $b$ of base-plate B and is interposed between the bottom of said plate and a cap N, which is also comprised in the sweep-support, and has a marginal flange $s$ surrounding the upper portion of the ring I, as shown. Said cap is connected to the base-plate B through the medium of a central vertically-disposed bolt N', said bolt being headed at its upper end and threaded at its lower end and let into engagement with the interior threads of the post $c$. The taper-bore of the said post $c$ has for its purpose to guide the threaded end of the bolt N' into engagement with the interior threads $d$ incident to the assembling of the parts of the extractor.

P is the sweep of the extractor, which is designed for the connection of draft-animals and is arranged on and connected to the cap N of the sweep-support by bolts or other suitable means, and Q is a rock-shaft, which is journaled in suitable bearings on the sweep and is provided at its opposite ends with handles $r'$ and at intermediate points of its length with cranks $s'$. These latter are designed for the connection of the upper sections $t$ of vertically-movable pitmen, which are connected by screw-threads or other suitable means to lower sections $u$, which terminate in inwardly-directed ends $v$, let into recesses $w$ in the clutch L. The connection between the upper and lower sections of the pitmen is obviously an adjustable one and is provided in order that the pitmen may be increased or diminished in length, according to the range of movement which the clutch is to have. The upper sections of the pitmen have horizontally-disposed slots $x$ to receive the cranks $s$ and are guided in their vertical movements by brackets $y$, which brackets also form bearings for the inner portion of the rock-shaft Q, as shown.

By virtue of the construction described it will be observed that an attendant standing at either end of the sweep is enabled, through the medium of one of the handles $r$, to rock the shaft Q, and thereby quickly raise the clutch L out of engagement with the clutch face or projections $m$ at the upper end of the drum K and throw said drum out of gear, also that the attendant is enabled to as quickly lower the clutch into engagement with the drum, so as to cause the latter to turn with the sweep and sweep-support. It will also be observed that while the clutch is movable vertically into and out of engagement with the drum it is at all times securely fixed to the sleeve of the sweep-support, so as to insure the transmission of rotary motion to the drum when the sweep and sweep-support are rotated. Moreover, it will be appreciated that by virtue of the manner in which the sweep and sweep-support are arranged the drum K may be freely rotated by hand when the clutch L is disengaged therefrom, and also that there is but little liability of the drum being subjected to frictional wear incident to such rotation. This is due in part to the fact that the sleeve M is held in position and prevented from wearing against the trunnion $e'$ of the drum by the post $c$, which serves as a pivot for the sleeve, and also to the fact that the ring I prevents the cap of the sweep-support from wearing on the drum.

By reason of the drum being free from undue friction when the clutch L is disengaged therefrom the turning of the drum by hand through the medium of the flange or handhold $k$ may be very easily accomplished.

T is a lever fulcrumed on the base-plate B and adapted to be moved by the foot of the operator into engagement with an arm $a'$ of the pawl H to disengage said pawl from the toothed flange of the drum K when it is desired to turn said drum backwardly, and U U are cable-guides, of which two are preferably employed. These guides are disposed vertically at opposite sides of the drum K and are provided with upper and lower arms $b'$, pivotally connected to the post C, so as to enable them to swing and carry the guides toward and from the drum. The lower arms of the guides are connected by a coiled spring V, which operates to draw the guides in toward the drum. The inward movement of the guides under the action of the spring V is, however, limited by screws W, mounted in the lower arms $b'$ and adapted to engage posts X, rising from the base-plate B, this in order to leave sufficient space between the periphery of the drum and the guides for one layer of rope, so as to enable the whirls of the rope or cable to fall together when the drum is thrown out of gear and the whirls of cable are rendered loose thereon. While the guides are held, as stated, a sufficient distance away from the periphery of the drum to enable the whirls of the cable to fall, as stated, it will be seen that they are calculated to effectually prevent the whirls of cable from overlapping each other, and consequently insure the presentation of a smooth and even surface to the second layer of cable wound on the drum. At the commencement of the winding of the second layer of cable on the drum the guides, by reason of the tension of spring V, exert pressure against the cable, and thereby insure it being wound in an even manner and also prevent its whirls from overlapping each other.

Y is what I term a "slack-rope reel," the same having for its purpose to take up slack of the cable, so that a longer cable than can be wound on the drum may be used, or only a portion of the cable may be used when the stump being extracted is close to the extractor. The said reel, which is preferably of metal, is circular in form and of U shape in cross-section. It is provided with one or more hooks $c'$ or other suitable devices to hold the rope, the hook or hooks being arranged at one side of the reel, so as to allow the cable to pull in a straight line and obviate the necessity of bending the cable, which would impose undue strain on the hooks. Slack of the cable is taken up by winding the same around the reel after the manner shown in Fig. 3, and the said reel is advantageous in that it does not entail the employment of a hitch or pulling rope and in that it may be readily attached to the cable at any point intermediate of the stump and drum and may as readily be removed from the cable without entailing the disconnection of the cable from the drum or the stump being extracted.

I have entered into a detail description of the construction and relative arrangement of parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claims.

Having described my invention, what I claim, and desire to secure by Letters Patent, is—

1. In a stump-extractor, the combination of a main frame, a cable-winding drum, cable-guides arranged adjacent to the periphery of the drum and having arms pivotally connected to the main frame, a spring interposed between and connected to arms of the guides, projections on arms of the guides, and stops on the main frame arranged in the paths of said projections.

2. In a stump-extractor, a main frame having a base provided with a central depression and a post rising from the bottom thereof, a drum having a hollow trunnion journaled in said depression of the base, a sweep, a sweep-support comprising a cap disposed above the drum, and a sleeve arranged in the drum and in the depression of the base and around the post thereof, and interposed between the cap and base, and a bolt arranged within the sleeve and connecting the cap and the base.

3. In a stump-extractor, the combination of a main frame comprising an upright post provided with a rib terminating at its lower end in a portion G of circular form in horizontal section, a drum having ratchet-teeth, and a pawl arranged to engage said teeth and having a circular opening receiving said portion G of the post.

4. In a stump-extractor, the combination of a main frame comprising a base provided with a central depression and a post rising from the bottom thereof, an upright, and a vertically-disposed ring connected to said upright, a drum arranged at its upper end within the ring and having a hollow trunnion at its lower end journaled in said depression of the base, a sweep, a sweep-support comprising a cap arranged on the ring of the frame, and a sleeve arranged within the drum and in the depression of the base and around the post thereof, a connection between the sweep-support and main frame, and means for effecting connection between the sweep-support and the drum.

5. In a stump-extractor, the combination of a drum having a clutch-face, a sweep-support, a sweep thereon, a vertically-movable clutch, a rock-shaft disposed longitudinally of and journaled on the sweep and having handles at different points in its length, and also having a crank, and suitable means connecting said crank and the clutch.

6. In a stump-extractor, the combination of a main frame, a drum having a clutch-face, a sweep-support, a sweep thereon, a rock-shaft journaled on the sweep, and having one or more cranks and one or more handles, a vertically-movable clutch, and connections between the clutch and the cranks of the rock-shaft; said connections comprising upper sections having horizontal slots receiving the cranks of the rock-shafts and guided in brackets on the sweep-support, and lower sections engaging the clutch and adjustably connected to the upper sections.

7. In a stump-extractor, the combination of a main frame, a drum, a sweep-support, a vertically-movable clutch adapted to engage the drum, a sweep connected to the sweep-support, a rock-shaft journaled on the sweep and extending throughout the length thereof, and having handles at its opposite ends, and one or more connections between said shaft and the clutch for moving the latter by the former.

8. In a stump-extractor, the combination of a main frame, a drum journaled at its lower and upper ends in said frame and having a clutch-face at its upper end, a vertically-movable clutch having teeth or cogs in its inner edge, a sweep-support arranged on the frame and comprising a cap, a depending sleeve extending through the drum and provided with teeth or cogs intermeshed with those of the clutch; the lower end of said sleeve being journaled in the base of the frame, a bolt extending through the sleeve and connecting the cap of the sweep-support and the base of the frame, a sweep on the sweep-support, a shaft disposed longitudinally of and journaled in bearings on the sweep, and having handles at different points, and one or more connections between the shaft and clutch for moving the latter by the former.

9. In a stump-extractor a main frame having a base provided with a central depression, a drum having a hollow trunnion journaled in said depression of the base, a movable clutch adapted to engage the drum and having teeth or cogs at its inner edge, a sweep, a sweep-support comprising a cap disposed above the drum, and a sleeve arranged in the drum and in the depression of the base and around the post thereof and interposed between the cap and base; said sleeve also extending through the clutch and having exterior teeth or cogs intermeshed with the interior teeth or cogs of the clutch, a bolt arranged within the sleeve and connecting the cap and the base, and means for moving the clutch toward and from the drum.

In testimony whereof I have hereunto set my hand in presence of two subscribing witnesses.

JOHN S. SWENSON.

Witnesses:
CARL W. REED,
PERCY A. CLEMMER.